United States Patent
Arbegast et al.

(10) Patent No.: US 6,230,957 B1
(45) Date of Patent: May 15, 2001

(54) METHOD OF USING FRICTION STIR WELDING TO REPAIR WELD DEFECTS AND TO HELP AVOID WELD DEFECTS IN INTERSECTING WELDS

(75) Inventors: William J. Arbegast, Picayune, MS (US); Paula J. Hartley, Slidell, LA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/262,900

(22) Filed: Mar. 5, 1999

Related U.S. Application Data
(60) Provisional application No. 60/077,296, filed on Mar. 6, 1998.

(51) Int. Cl.[7] ................................................ B23K 20/12
(52) U.S. Cl. ..................... 228/112.1; 228/2.1; 148/516
(58) Field of Search ........................ 228/2.1, 112.1; 148/516

(56) References Cited

U.S. PATENT DOCUMENTS

| | | | |
|---|---|---|---|
| 5,460,317 | 10/1995 | Thomas et al. ................... | 228/112.1 |
| 5,697,544 | * 12/1997 | Wykes ................................. | 228/2.1 |
| 5,713,507 | * 2/1998 | Holt et al. .......................... | 228/112.1 |
| 5,718,366 | 2/1998 | Colligan ............................. | 228/112.1 |
| 5,971,252 | * 10/1999 | Rosen et al. ....................... | 228/112.1 |
| 5,975,406 | * 11/1999 | Mahoney et al. .................. | 228/112.1 |
| 6,050,475 | * 4/2000 | Kinton et al. ...................... | 228/112.1 |

* cited by examiner

Primary Examiner—Clifford C. Shaw
Assistant Examiner—Kiley Stoner
(74) Attorney, Agent, or Firm—Garvey, Smith, Nehrbass & Doody, L.L.C.

(57) ABSTRACT

A method of using friction stir welding to repair weld defects and to help avoid weld defects in intersecting welds and crack-sensitive material, such as 2195 Al—Cu—Li. Intersecting fusion welds in 2195 Al—Cu—Li have shown a propensity to crack both during welding and during proof testing. These cracks have generally been associated with a particular metallurgical structure present in the fusion zone of VPPA/SPA weldments. HYBRID Friction Stir Overwelding of the initial VPPA/SPA weld from the penetration side is shown to convert the cast microstructure of these VPPA/SPA weldments into a fine grained, dynamically recrystallized microstructure showing higher strength, ductility, toughness, and resistance to intersection weld cracking.

7 Claims, 11 Drawing Sheets

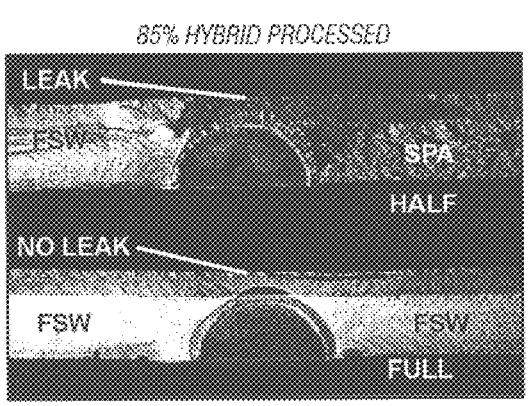
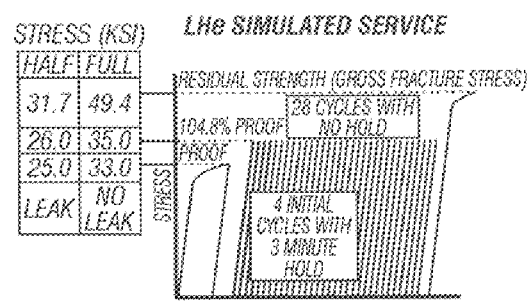
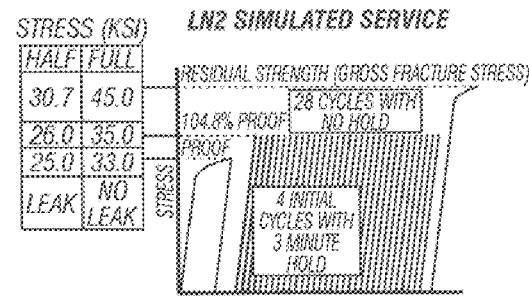
FIG. 7

- AC19
  - SHOWED ONE (1) PT INDICATION AFTER "H" PANEL WELDING AT W1/W3 INTERSECTION LOCATION
  - SHOWED ONE (1) RT INDICATION (NOT A CRACK) AT W1/W3 INTERSECTION LOCATION AFTER PROOF TEST CYCLING THROUGH 27KSI, 5 CYCLES
  - SHOWED FOUR (4) PT INDICATION AT THE W1/W3 LOCATION AND FOUR (4) PT INDICATIONS AT THE W1/W2 LOCATION AFTER 30 Ksi PROOF (15 MINUTE HOLD)
  - FRACTURED AT 42.2 Ksi (ROOM TEMPERATURE) IN WELD LOCATION W4 AFTER COMPLETING PROOF TEST CYCLING
- AC24
  - SHOWED ONE (1) PT INDICATION AT W1/W3 INTERSECTION LOCATION AND ONE PT INDICATION AT THE W1/W2 LOCATION AFTER "H" PANEL WELDING
  - SHOWED NO RT INDICATIONS AFTER PROOF TEST CYCLING THROUGH 27KSI, 5 CYCLES
  - SHOWED TWO (2) NEW PT INDICATION AT THE W1/W3 AND THE W1/W2 LOCATION AFTER 30 Ksi PROOF (15 MINUTE HOLD)
  - FRACTURED AT 41.7 Ksi (ROOM TEMPERATURE) IN WELD LOCATION W5 AFTER COMPLETING PROOF TEST CYCLING
- AC32
  - NO REPORTED PT OR RT INDICATIONS AFTER "H" PANEL WELDING
  - NO REPORTED PT OR RT INDICATIONS AFTER SIMULATED SERVICE TESTING
  - FRACTURED AT 41.5 Ksi (ROOM TEMPERATURE) IN WELD LOCATION W4 AFTER COMPLETING SIMULATED SERVICE TESTING
- AC37
  - NO REPORTED PT OR RT INDICATIONS AFTER "H" PANEL WELDING
  - NO REPORTED PT OR RT INDICATIONS AFTER PROOF TEST CYCLING
  - REPORTED TO HAVE "PASSED ROOM TEMPERATURE PROOF"

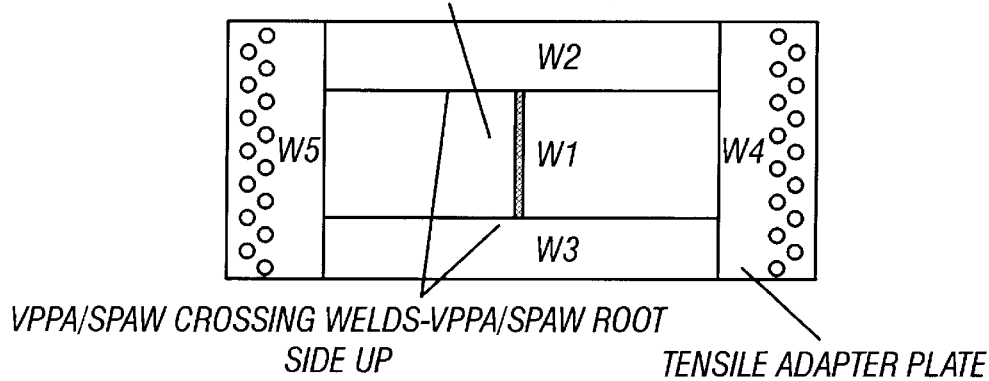

FIG. 10

METHOD OF USING FRICTION STIR WELDING TO REPAIR WELD DEFECTS AND TO HELP AVOID WELD DEFECTS IN INTERSECTING WELDS

CROSS-REFERENCE TO RELATED APPLICATIONS

Priority of U.S. Provisional Patent Application Ser. No. 60/077,296 filed Mar. 6, 1998, and incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to friction stir welding. More particularly, the present invention relates to using friction stir welding to repair weld defects and to help avoid weld defects in intersecting welds in crack-sensitive material.

Even more particularly, the invention relates to hybrid friction stir welding (FSW) as a defect repair technique and microstructure modification approach to intersection weld crack mitigation for 2195 Al—Cu—Li VPPA/SPA (variable polarity plasma arc/soft plasma arc) weldments.

2. General Background of the Invention

Friction stir welding (FSW) is a solid state joining process developed by The Welding Institute (TWI), Cambridge, England and described in U.S. Pat. No. 5,460,317, incorporated herein by reference. Also incorporated herein by reference are U.S. Pat. No. 5,718,366 and all references disclosed therein.

BRIEF SUMMARY OF THE INVENTION

The apparatus of the present invention solves the problems confronted in the art in a simple and straightforward manner. What is provided is a method of repairing defects in a weld in a welded article, comprising using friction stir welding to rework the weld until a targeted strength is reached or exceeded. Another aspect of the present invention is a method of avoiding defects in intersecting welds in a welded article, comprising using friction stir welding to rework at least one weld of intersecting welds until a targeted strength and/or a targeted integrity is reached or exceeded. Another embodiment of the present invention is a method of avoiding defects in intersecting welds in a welded article, comprising using friction stir welding to create at least one of the intersecting welds. Yet another embodiment of the present invention is a method of producing a welded article having intersecting welds, comprising making at least some of the intersecting welds with weld techniques other than FSW, then reworking at least some of the intersecting welds with FSW. The present invention also includes the products made by the methods of the present invention.

This process is intended to be used on aerospace propellant tank components (such as the LH2 and LOX Barrels of the SLWT (super light weight) External Tank Program) to minimize the number of as-welded and post-proof intersection weld cracks.

Hybrid Friction Stir Welding also has application on ship building, bridge building, aircraft, food processing equipment, and any other industry where aluminum alloys are welded.

During preparation of test panels for this program, it was noted that heavily peaked and mismatched VPPA/SPA panels were essentially de-peaked and were left in a flat configuration after performing the hybrid FSW process. This has implication for using the hybrid FSW process to relieve residual stresses and correct "oil-canning" of propellant tank components (such as LH2 and LOX Tank components).

This process also has potential to repair "Out of Grade" VPPA/SPA welds by defect elimination.

This process is also a candidate replacement for mechanical planishing operations.

This process can be used to rework welds produced by welding methods including, but not limited to, fusion (including resistance, arc ((MIG—metal inert gas (GMAG—gas metal arc welding), TIG—tungsten inert gas (GTAW—gas tungsten arc welding) SMAW (shielded metal arc welding)), electron beam, and laser), and solid state (inertia, friction stir, friction plug, explosive, and ultrasonic).

As used herein, a weld expressed as a percentage indicates the percentage of thickness of the penetration of the pin of the FSW device into the weld—e.g., a 85% weld indicates that the pin penetrates through 85% of the thickness of the weld. In general, the more one goes through the thickness, the stronger the weld becomes, though sometimes it is better not to rework the entire weld.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 7 shows the increase in room temperature proof load levels before "Leak" and cryogenic residual strength after simulated service testing of hybrid FSW welds;

FIG. 10 shows "H" panel configuration and MSFC, Huntsville, testing results;

DETAILED DESCRIPTION OF THE INVENTION

Friction stir welding (FSW) is a solid state joining process developed by The Welding Institute (TWI), Cambridge, England. The original process development by the present inventors using FSW produced high strength (70% joint efficiency) autogenous welds in Al 2195 which were essentially free of defects and distortions. Continuing efforts have also investigated: 1) HYBRID FSW process as a repair technique for existing VPPA/SPA welds; 2) Intersection crack mitigation by using HYBRID FSW to modify the metallurgical structure of the crack sensitive fusion zone of the VPPA/SPA seal and push pass; and, 3) tooling requirements and implementation plans.

Figure 1:
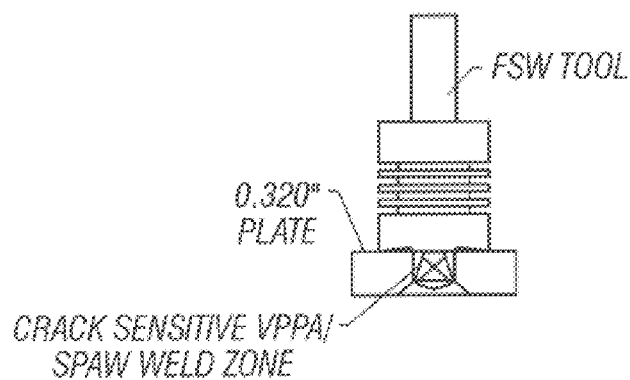
FIG. 1 shows hybrid FSW overwelding of a VPPA/SPA weld.
Figure 2:
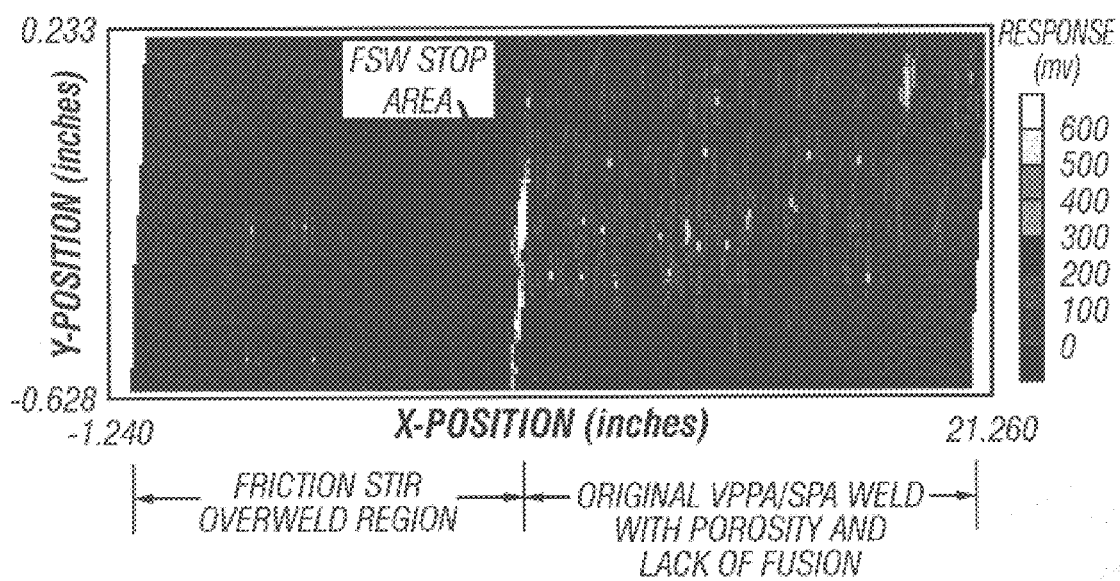
FIG. 2 is an EMATS C-scan of a OADC weld panel showing elimination of porosity and LOF after hybrid FSW reprocessing.
Figure 3:
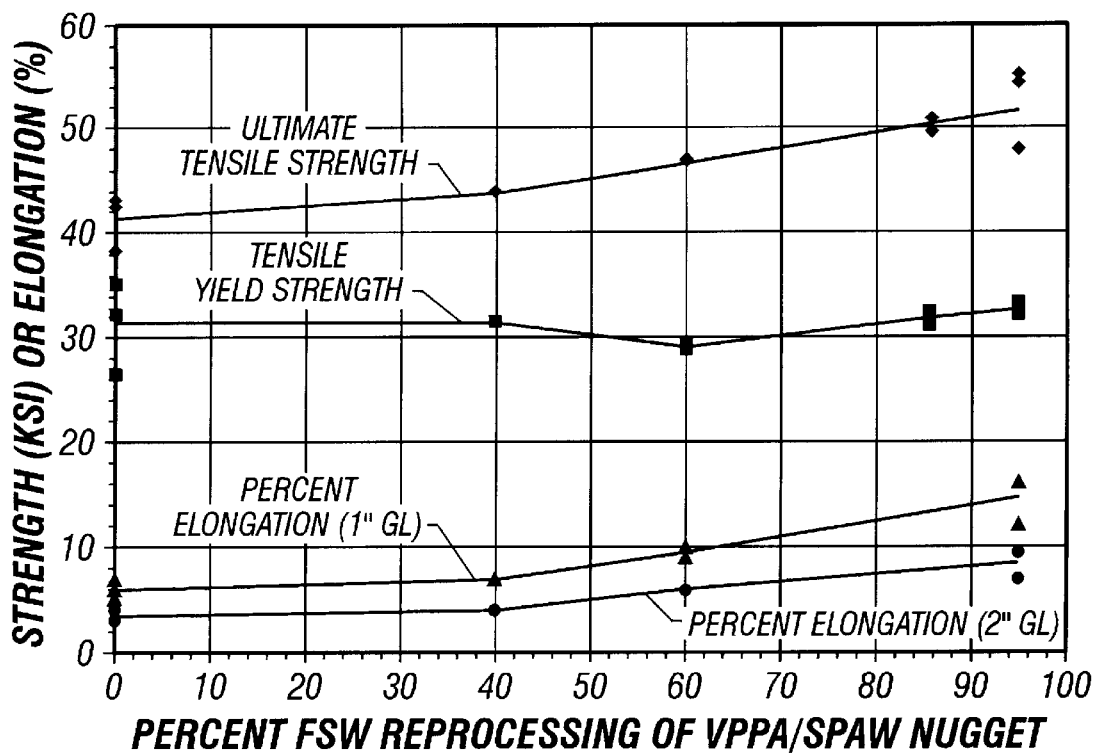
FIG. 3 is a graph showing property increase of VPPA/SPAW welds after friction stir weld dynamic recrystallization, and in particular the increase in tensile properties and ductility with increase in degree of hybrid FSW reprocessing.
Figure 4:
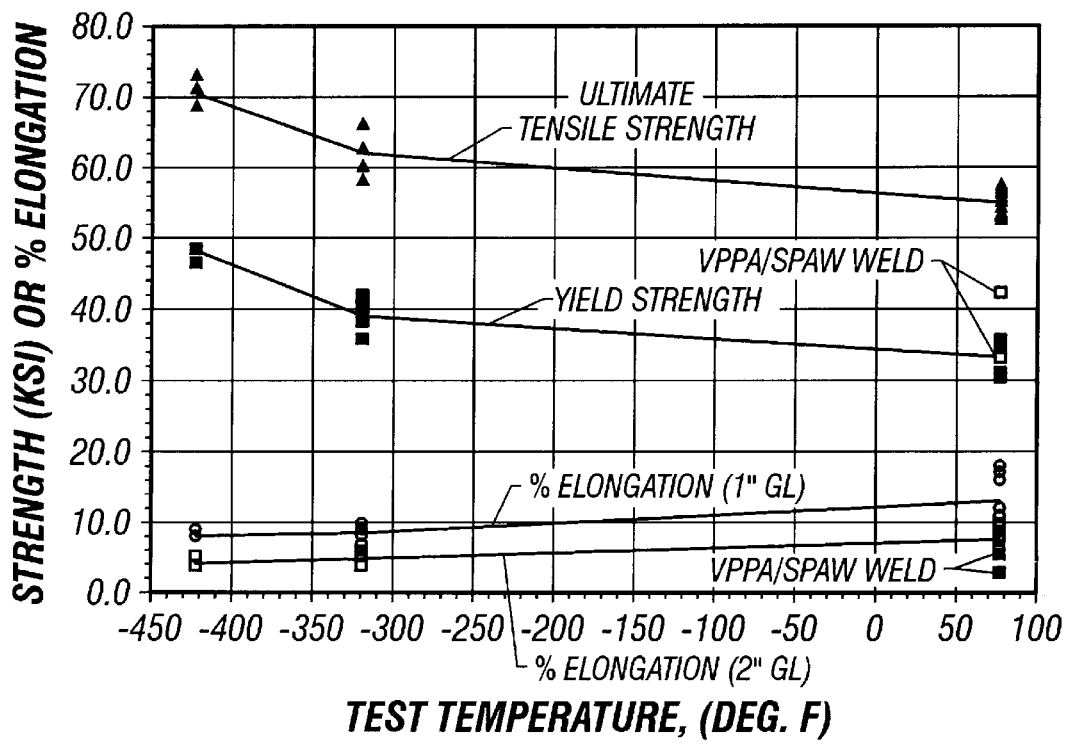
FIG. 4 shows cryogenic properties of hybrid FSW reprocessed VPPA/SPA welds, and more particularly shows mechanical properties vs. temperature for FSW overwelds of VPPA/SPAW (4043 filler) in 0.320" 2195-T8M4 plate, with 85% nugget reprocessing from root side.

To demonstrate VPPA/SPA repair capabilities, the HYBRID FSW process (FIG. 1) was applied to a 0.385" Al 2195/Al 2219 VPPA/SPA weld produced to the external tank dome cap weld schedule. This panel previously had failed to meet the specification requirements for porosity and lack of fusion (LOF). An EMATS scan (FIG. 2) of this test panel after half of the weld length was reprocessed by the HYBRID FSW showed that it now met the specification requirements. Tests have also shown that the strength of VPPA/SPA welds reprocessed to various degrees in this manner can increase from a average Ftu of 41 Ksi to an average Ftu of 52 Ksi with an increase in ductility to over 10% E in 1" GL (FIG. 3).

Figure 5:
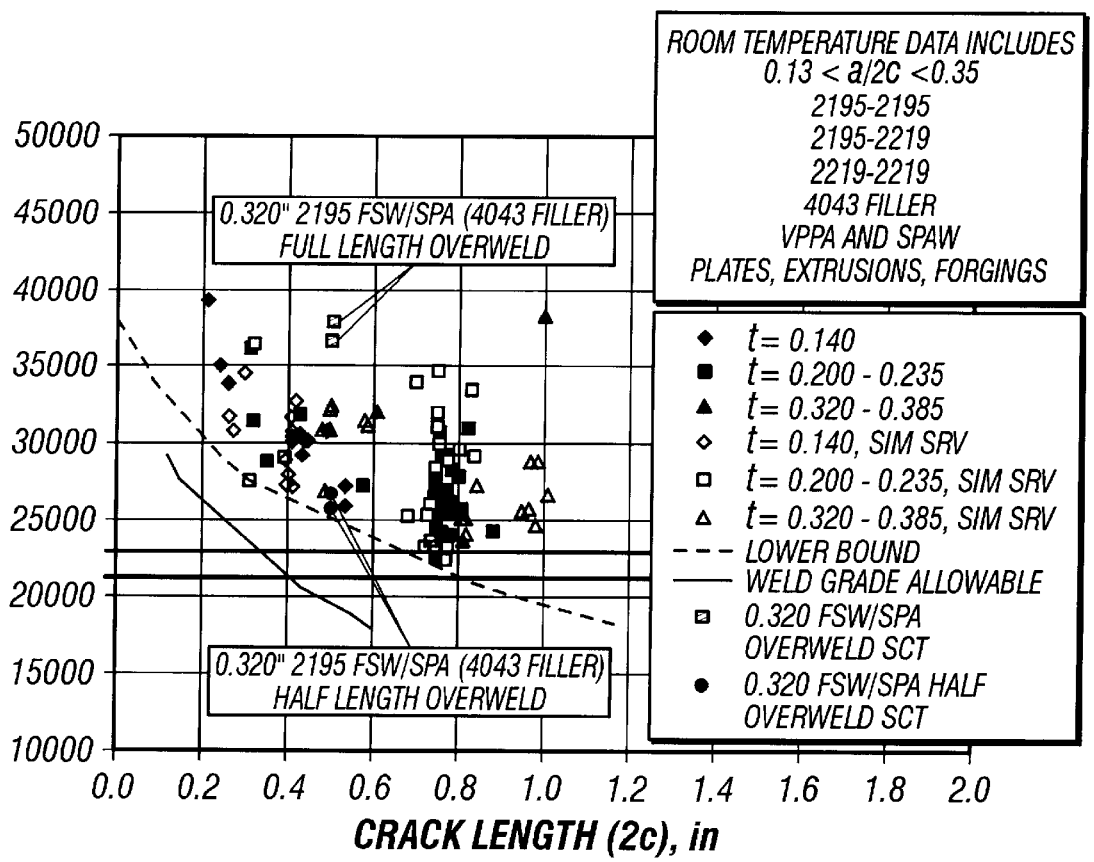
FIG. 5 shows room temperature residual strength as a function of surface crack length for various material combinations and conditions, and more particularly shows room temperature SCT residual strength of 85% hybrid FSW compared to various combinations of 2195 and 2219 weldment.
Figure 6:
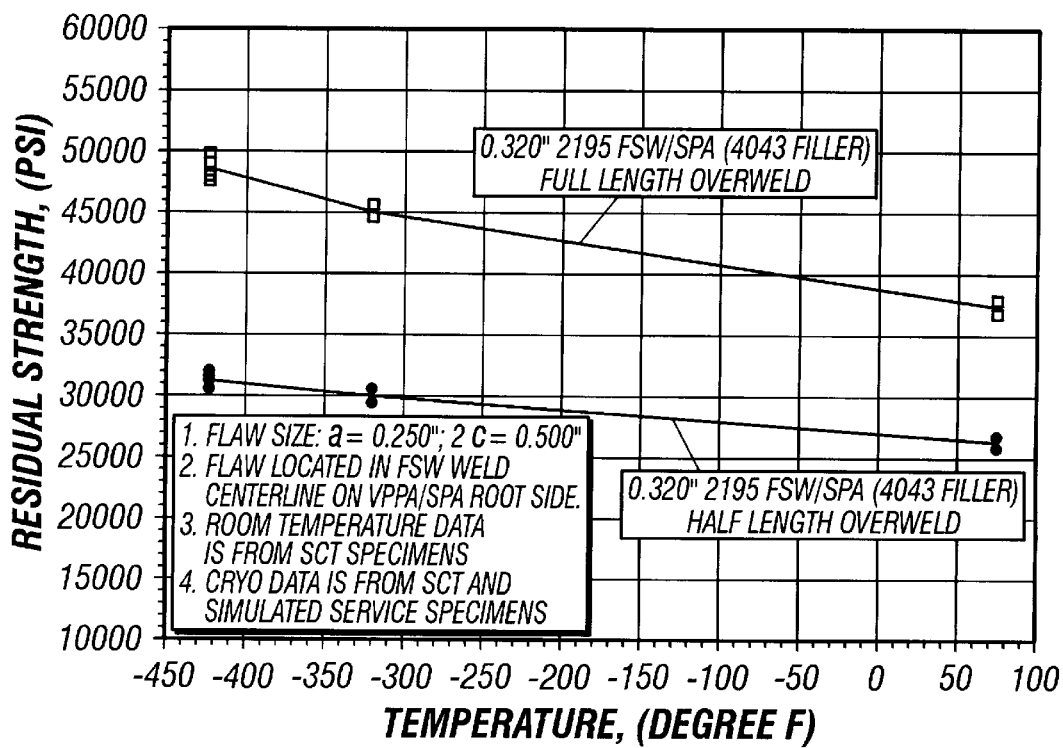
FIG. 6 shows increase in SCT residual strength with decreasing temperature, and particularly shows residual strength as a function of temperature for friction stir overwelded 0.320" 2195 VPPA/SPA welds (4043 filler) with 85% reprocessing from root side.

Similar improvements in room temperature Surface Cracked Tension (SCT) residual strength (FIG. 5) and cryogenic SCT residual strength (FIG. 6) have been shown. Increased simulated service room temperature proof levels before "Leak" and subsequent cryogenic residual strength increases after 4 mission cycles at 104.8% of proof load have been observed for HYBRID FSW reprocessed Al 2195 VPPA/SPA welds (FIG. 7).

Figure 8:
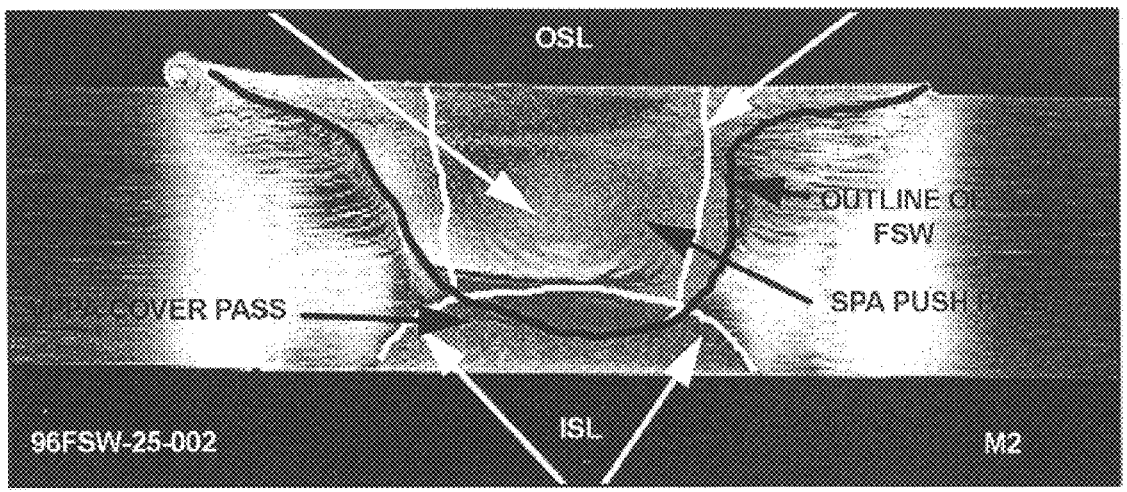
FIG. 8 shows the microstructure of 85% hybrid FSW in 0.320" 2195 VPPA/SPA weld showing elimination of crack sensitive fusion line zones.
Figure 9:
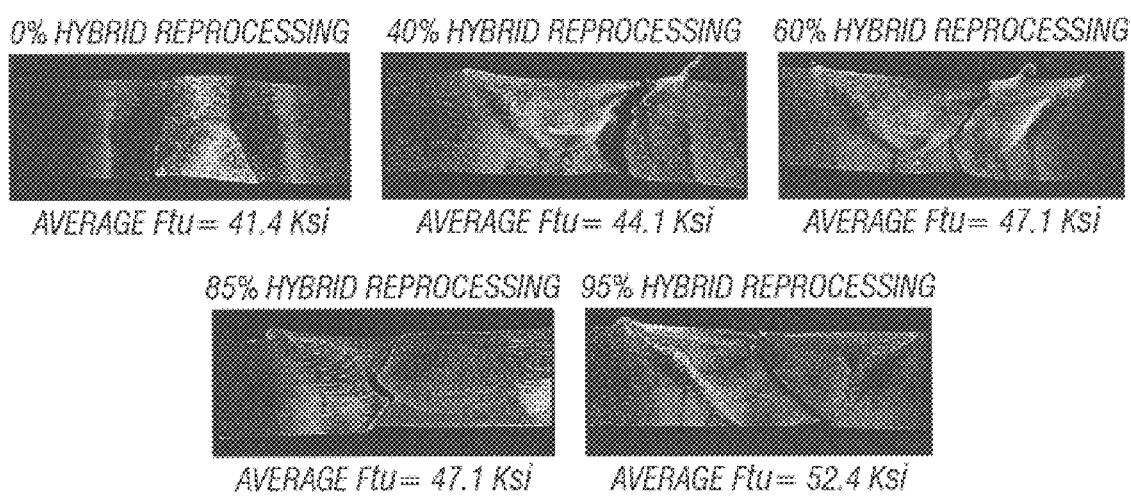
FIG. 9 shows macros of tensile specimens from various percent hybrid FSW showing the influence of degree of reprocessing on strength and fracture path.

The microstructure of the HYBRID FSW reprocessed VPPA/SPA weld is modified from the original cast microstructure to a dynamically recrystallized one showing several distinct metallurgical features (FIG. 8). Most notably is the elimination of the original VPPA/SPA seal and push pass fusion line areas where the crack sensitive equiaxed grain structure has traditionally been observed. Depending on the degree of HYBRID FSW reprocessing, various amounts of the original VPPA/SPA cover pass still remain. It is the quantity of original VPPA/SPA material remaining which governs the HYBRID FSW weld strength with higher strengths being attained with more of VPPA/SPA cast nugget being reprocessed (FIG. 9).

HYBRID FSW reprocessed VPPA/SPA welds were prepared for "H" panel testing. These "H" panels were welded to represent the "crown-to-root" weld configuration seen on the barrel-to-ring welds for propellant tanks (such as the LOX and LH2 tanks). Each of the 3 pass VPPA/SPA, 0.320" Al 2195-T8M4 plate welds representative of the LH2 barrel welds were HYBRID FSW welds reprocessed 85% from the root side. The crossing welds represented the circumferential welds of the LH2 tank (FIG. 10).

The first two samples submitted were reported to have slight surface penetrant indications and no "crack-like" radiographic indications after "H" panel preparation. These penetrant indications were NOT of the same kind as seen during "H" panel testing of non-HYBRID FSW reprocessed welds. The panels were than subjected to a series of proof tests (10 Ksi, 15 minute hold; 15 Ksi, 15 minute hold; 20 Ksi, 15 minute hold; 27 Ksi, 15 minute hold; 27 Ksi, 5 cycles, no hold; 30 Ksi, 15 minute hold) which after each step radiographic inspection was performed with penetrant inspection also being conducted after the 30 Ksi, 15 minute hold cycle and prior to fracture. Again, no "crack-like" radiographic indications were reported after each of these steps. Penetrant inspection after the 30 Ksi cycle did, however, reveal that surface cracking not detectable by x-ray was occurring during some point in the proof test cycles.

Figure 11:
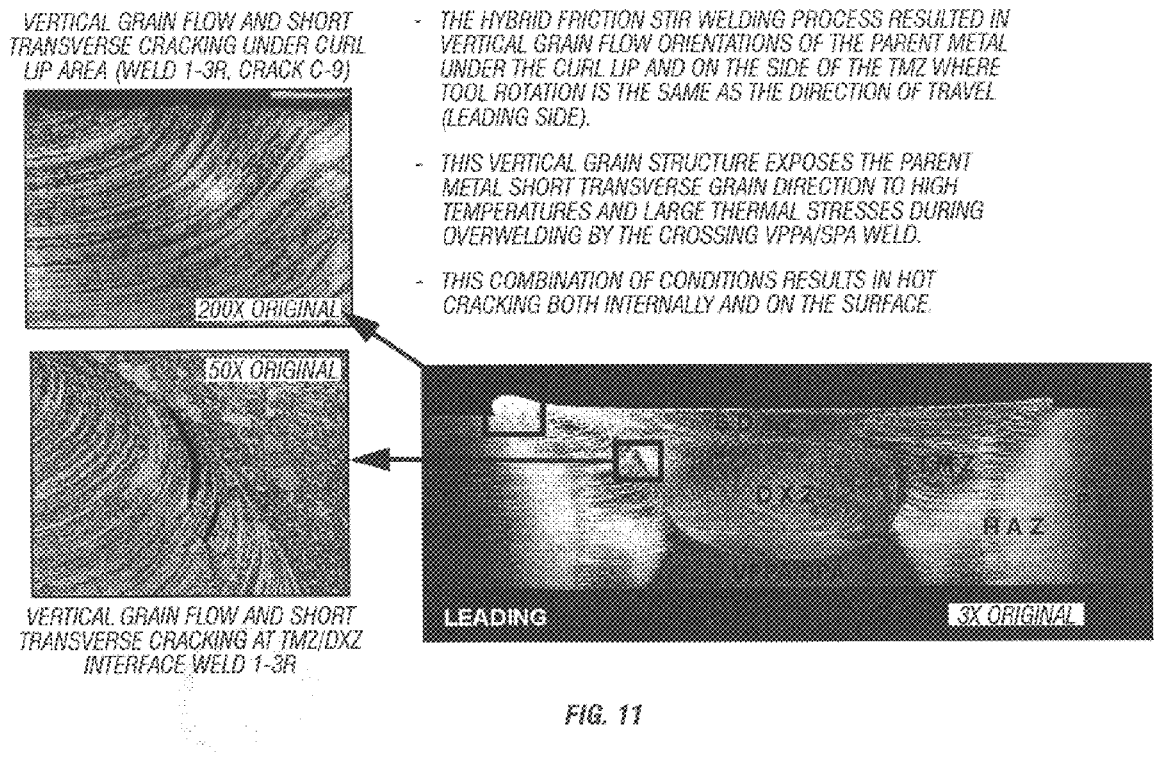
FIG. 11 shows vertical grain lifting of 85% hybrid FSW reprocessed 0.320" 2195 VPPA/SPA welds.
Figure 12:
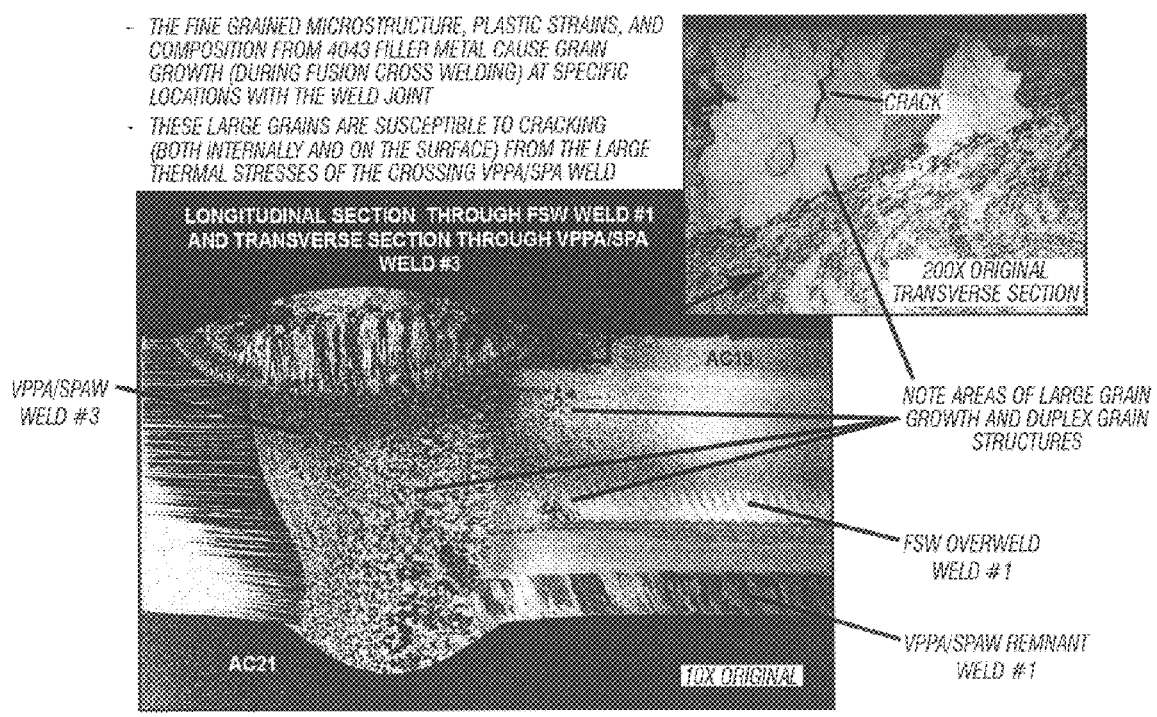
FIG. 12 shows duplex grain structure and grain growth in 85% hybrid FSW reprocessed 0.320" 2195 VPPA/SPA intersection weld.

Subsequent metallurgical examination indicated that these highly superficial penetrant indications were associated with the "grain lifting" that results in the curl area on the leading side of the HYBRID FSW (FIG. 11). Also contributing to these surface penetrant indications is the presence of a cracked duplex grain structure (FIG. 12) in the HYBRID FSW surface reheated zone which is the result of grain growth during heating by the crossing weld. At which point these surface indications appeared (i.e., before or after the 40+ Ksi fracture loads) is unknown at this time.

Two additional "H" panels with 85% HYBRID FSW reprocessed VPPA/SPA welds were made with increased care taken during bead shaving and polishing prior to crossover welding to remove these grain lifting and grain growth areas from the surface. These panels were reported to have exhibited no radiographic or penetrant indications during the "H" panel welding and subsequent proof cycle testing.

As a result of the higher mechanical properties developed during the preliminary HYBRID FSW assessments and the crack mitigation benefits of the microstructural modification of the original VPPA/SPA welds, a full scale LOX barrel demonstration program was initiated. This program uses a three phase approach to verify that the proposed intersection crack mitigation scheme is indeed value added. PHASE 1 demonstrates the HYBRID FSW technology on the last 8" of VPPA/SPA weld for each of the longitudinal LOX barrel welds. PHASE 2 demonstrates the technology on the extrusion to extrusion welds of the LOX barrel "T" ring. During PHASE 3, the LOX barrel and "T" ring will be joined using production VPPA/SPA weld schedules for the circumferential weld.

Figure 13:
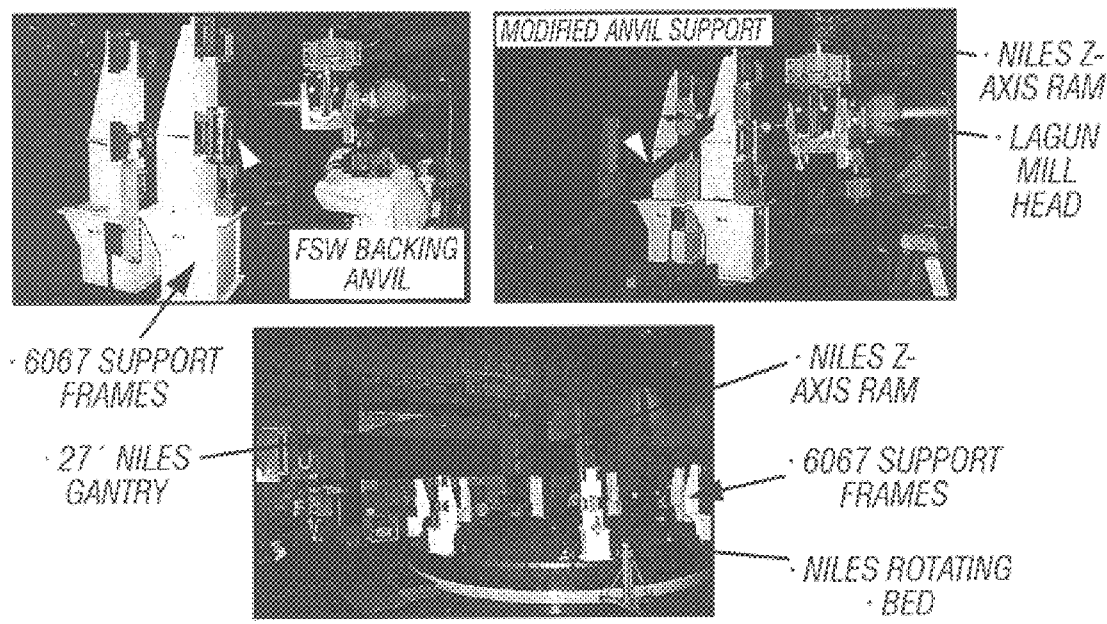
FIG. 13 shows a LAGUN mill head mounted on 27' NILES tool post and modified 6067 support pedestals in preparation for full scale LOX barrel hybrid FSW demonstration.
Figure 14:
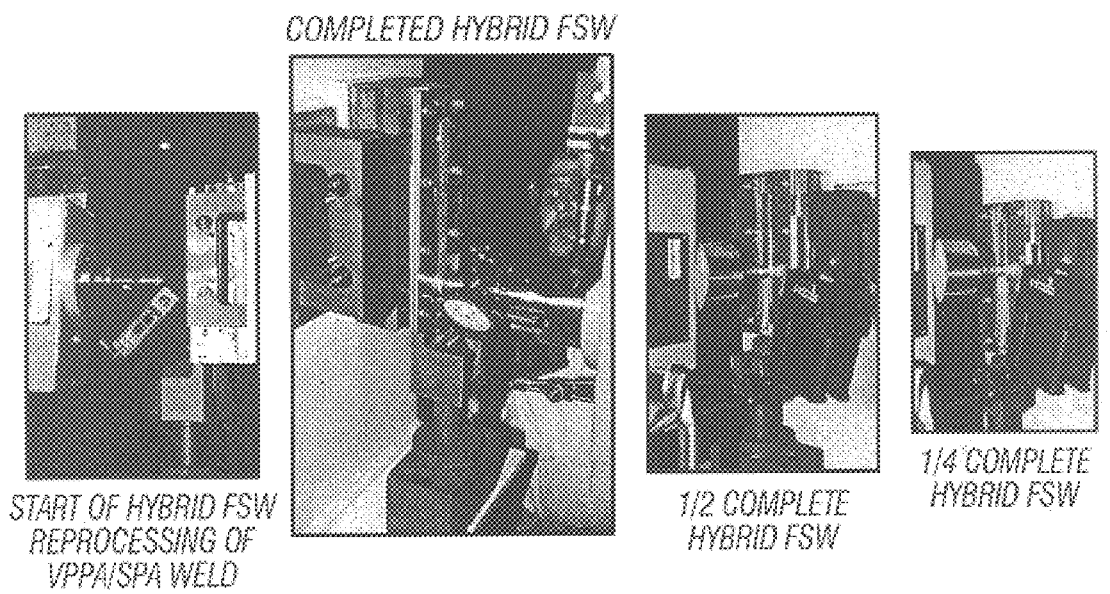
FIG. 14 shows hybrid FSW flat plate tests on 27' NILES (flat plate test panels were used to check out 27' NILES fixtures and procedures prior to emplacing full scale LOX barrel for hybrid FSW reprocessing of VPPA/SPA longitudinal welds)

A 27" Niles Vertical Mill was modified to accept a commercial LAGUN Mill. The support pedestals were similarly modified to accept the LOX barrel and to provide back side anvil support necessary for the HYBRID FSW process (FIG. 13). Flat test panels of 0.385" Al 2195-T8M4 plate with Al 4043 VPPA/SPA welds were processed to verify HYBRID FSW parameters and to validate the structural integrity of the tooling (FIG. 14). Visual and radiographic inspection of these welds showed them to be acceptable.

Figure 15:
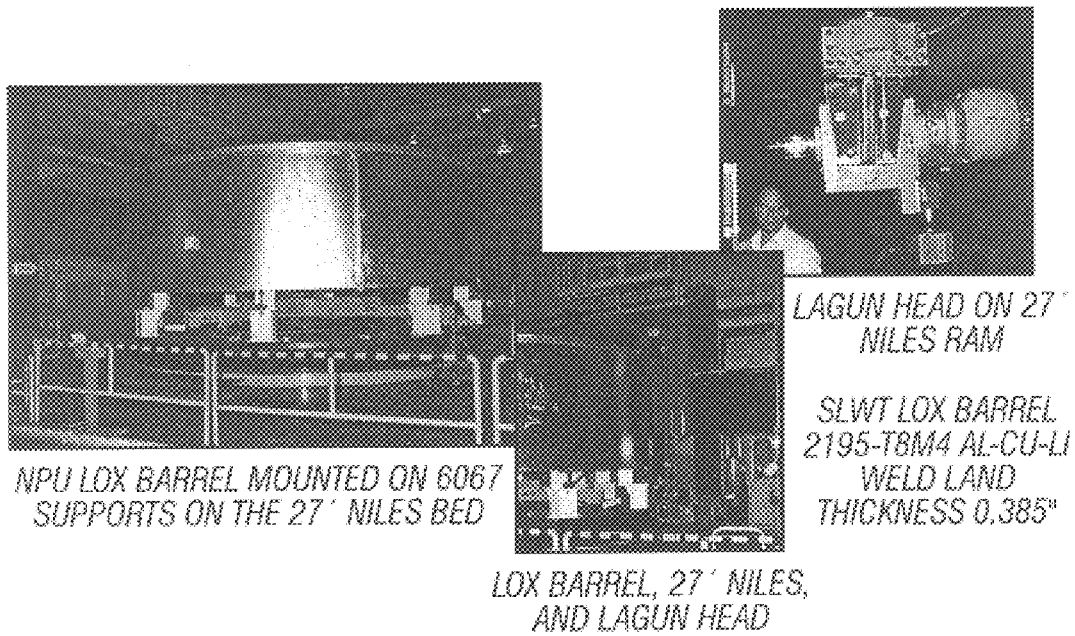
FIG. 15 shows NPU LOX barrel installed on 27' NILES in preparation for hybrid FSW reprocessing of longitudinal welds (the NPU SLWT LOX barrel assembly was installed onto the 27' NILES for hybrid friction stir weld reprocessing of 8" of the ends of the longitudinal VPPA/SPA barrel welds)
Figure 16:
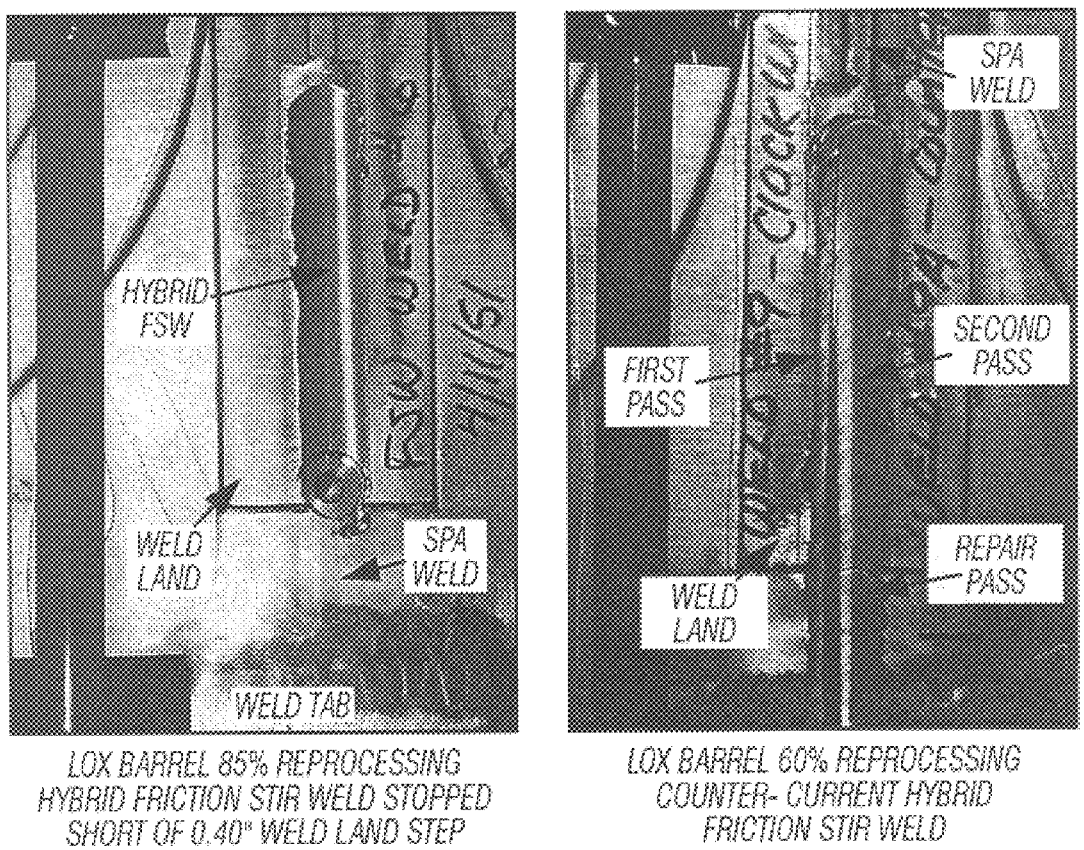
FIG. 16 shows single pass and side-by-side hybrid FSW welds on NPU LOX barrel longitudinal 4043 VPPA/SPA welds (the 0.385" 2195-T8M4 LOX barrel panel VPPA/SPA longitudinal fusion welds were successfully reprocessed into the hybri wrought structure by FSW overwelding.

The NPU (non-production unit) LOX barrel was placed onto support pedestals (FIG. 15) and HYBRID FSW was conducted on the last 8" of each of the four (4) VPPA/SPA longitudinal welds at the bottom of the barrel. Two (2) single pass 85% HYBRID FSW and two (2) side-by-side 60% HYBRID FSW welds were made using parameters developed during preliminary assessment trials (FIG. 16). One side-by-side weld was processed in a concurrent manner with the direction of tool rotation for both passes being clockwise. The other side-by-side weld was done in a countercurrent manner with the first weld pass being clockwise and the second pass being counter-clockwise. Both of the side-by-side welds experienced difficulty in transitioning the 0.40" weld land step and left a surface LOF indication. These were subsequently removed by re-plunging and rewelding over the defect area. In-situ radiographic inspection of these welds revealed that no defects are currently present.

Tooling reaction loads were obtained during the NPU LOX barrel HYBRID FSW demonstration. These loads are ½ to ⅔ less for the HYBRID FSW than for an AUTOGENOUS FSW (ie., not over a VPPA/SPA weld) due to the presence of the softer Al 4043 filler metal in the panel containing the hybrid FSW.

Currently, PHASE 2 efforts are in progress with the HYBRID FSW development for extrusion to extrusion welds for LOX barrel "T" rings and chords. PHASE 3 efforts are awaiting a production window to weld the PHASE 1 NPU LOX barrel to the PHASE 2 NPU LOX "T" Ring to validate the value-added nature HYBRID Friction Stir Welding.

All measurements disclosed herein are at standard temperature and pressure, at sea level on Earth, unless indicated otherwise. All materials used or intended to be used-in a human being are biocompatible, unless indicated otherwise.

The foregoing embodiments are presented by way of example only; the scope of the present invention is to be limited only by the following claims.

What is claimed is:

1. A method of repairing or avoiding defects in intersecting fusion welds in a welded article made of an Al—Li alloy, comprising:
    using friction stir welding to rework at least one of the intersecting welds until a targeted strength is reached or exceeded.

2. The method of any one of claims 1, wherein the welded article is part of an LH2 or LOX Barrel of the SLWT External Tank Program.

3. The method of any one of claim 1 wherein the initial welds are made by welding methods from the group consisting of:
    fusion welding (including resistance, arc ((MIG—metal inert gas, (GMAW—gas metal arc welding), TIG—tungsten inert gas (GTAW—gas tungsten arc welding) SMAW (shielded metal arc welding)), electron beam welding, and laser welding), and
    solid state (inertia, friction stir, friction plug, explosive, and ultrasonic) welding.

4. The method of claim 1 wherein the initial welds are made by VPPA/SPA.

5. The method of anyone of claim 1, wherein the welded article is part of a propellant tank.

6. The method of any one of claims 1, wherein the welded article is part of a propellant tank for aerospace applications.

7. A method of avoiding defects in intersecting welds in a welded article, comprising:
    using friction stir welding to rework at least one weld of intersecting welds until a targeted strength and/or a targeted integrity is reached or exceeded.

* * * * *